US005552196A

United States Patent [19]

Haselkorn et al.

[11] Patent Number: 5,552,196

[45] Date of Patent: *Sep. 3, 1996

[54] INSULATED PORT LINEAR ASSEMBLY

[75] Inventors: Michael H. Haselkorn; Michael C. Long, both of Peoria, Ill.

[73] Assignee: Caterpillar Inc., Peoria, Ill.

[ * ] Notice: The term of this patent shall not extend beyond the expiration date of Pat. No. 5,404,716.

[21] Appl. No.: 452,223

[22] Filed: May 26, 1995

Related U.S. Application Data

[63] Continuation-in-part of Ser. No. 201,290, Feb. 24, 1994.

[51] Int. Cl.$^{6}$ ................................ B32B 1/08; F01N 7/10

[52] U.S. Cl. .................................... 428/34.5; 29/888.061; 60/323; 138/146; 138/149; 164/98; 428/34.7; 428/36.2; 428/36.91

[58] Field of Search ................................ 428/34.5, 34.6, 428/34.7, 36.1, 36.2, 36.9, 36.91; 29/888.061; 60/272, 323; 138/145, 146, 149, DIG. 10; 164/98

[56] References Cited

U.S. PATENT DOCUMENTS

| | | | |
|---|---|---|---|
| 3,577,727 | 5/1971 | Warren et al. | 60/272 |
| 3,919,755 | 11/1975 | Kaneko et al. | 29/156.4 |
| 4,341,826 | 7/1982 | Prewo et al. | 428/36.1 |
| 4,346,556 | 8/1982 | Rice et al. | 60/272 |
| 4,873,952 | 10/1989 | Narita et al. | 123/270 |
| 5,150,572 | 9/1992 | Johnson et al. | 60/272 |
| 5,260,116 | 11/1993 | Hamanaka et al. | 428/172 |
| 5,404,716 | 4/1995 | Wells et al. | 60/272 |

*Primary Examiner*—Marion E. McCamish
*Assistant Examiner*—Blaine R. Copenheaver
*Attorney, Agent, or Firm*—Diana L. Charlton

[57] ABSTRACT

The design and construction of past port liners with heat insulation capabilities have had to become more simple in order to reduce costs. However, less costly exhaust port liners may have inferior heat insulation capabilities. Additionally, port liners cast into a cylinder head of an internal combustion diesel engine must endure the stresses associated with the high casting temperatures of cast iron. The present invention overcomes these and other problems by utilizing a ceramic port liner containing a low temperature softening phase. The ceramic port liner is surrounded by a blanket formed when a fiberglass cloth encapsulates an insulating layer of material. The ceramic port liner and surrounding blanket are cast within a cylinder head. During the casting process, the ceramic port liner remains in a softened state. As the casting cools, the ceramic port liner returns to a regular solid state at a progressively sufficient thermal rate to protect it from damage. The ability to protect the ceramic port liner during casting enables it to be used in conjunction with the surrounding blanket, decreasing the rate of heat loss. The ability to decrease the rate of heat loss increases engine efficiency.

16 Claims, 4 Drawing Sheets

INSULATED PORT LINEAR ASSEMBLY

This is a continuation-in-part of U.S. patent application Ser. No. 08/201,290 (pending) filed Feb. 24, 1994.

TECHNICAL FIELD

This invention relates generally to a port liner for use in an internal combustion engine and more particularly to the insulation of the port liner for reduced heat rejection.

BACKGROUND ART

Present day engine components must be manufactured more simply at significantly reduced costs while achieving superior results in order for engine manufacturers to remain competitive. Unfortunately, port liners that have become less complicated have either failed to produce superior heat insulation capabilities or have become less durable, increasing associated replacement costs.

The heat-insulated port liner for a device composed of a cast metal disclosed in U.S. Pat. No. 4,676,064 by Yoshinori Narita et. al. on Jun. 30, 1987 includes a tubular port liner composed of a ceramic material, a first covering layer disposed on the outer surface of the liner and composed of refractory fibers, and a second covering layer disposed on the outer surface of the first covering layer and composed of a metal having a melting point not lower than the melting point of the cast metal. The port liner is made from a material having a low coefficient of thermal expansion and high thermal resistance, such as, aluminum titanate. Unfortunately, no range is given for the coefficient of thermal expansion needed for the port liner used with a cast aluminum cylinder head. It is well known that the melting point of aluminum is lower than that of cast iron and that aluminum titanate can be effectively used with molten aluminum. However, aluminum titanate, if not sufficiently stabilized, will decompose if exposed to the high temperatures associated with molten cast iron. Additionally, the aluminum titanate will subsequently fail due to the contraction stresses imposed during the casting process. Therefore, an aluminum cylinder head can utilize a port liner made from a material, such as aluminum titanate. However, the port liner disclosed by Narita would be destroyed during the casting process if used with a cast iron cylinder head. Additionally, since the first covering layer is unsupported, settling of the refractory fibers occurs when the fibers are exposed to typical engine vibration experienced during operation. This settling effect limits the effectiveness of the insulation and may lead to the destruction of the entire insulation layer. Once destroyed, the insulation would be free to disintegrate and enter the exhaust passage.

A method and apparatus for insulating the exhaust passage of an internal combustion engine is disclosed in U.S. Pat. No. 4,206,598 by Vemulapalli D. Rao on Jun. 10, 1980. A three-zone liner assembly is provided with an outer zone comprised of a room temperature vulcanizing silicone sleeve, an inner zone comprised of a stamped and seam welded high strength Al-Cr-steel alloy, and an intermediate zone consisting of a ceramic wool mat. The intermediate zone consisting of the ceramic wool mat of insulation is encased within the seam welded inner zone of metal protecting the insulation from damage. However, a room temperature vulcanizing silicone sleeve would not survive the cast iron casting process. Furthermore, the use of a silicon sleeve would be undesirable due to the additional source of gas/porosity and the probable remnants left behind after the casting process. Additionally, if the weld fails, the insulation is subjected to possible damage which, as with Narita, would cause disintegration of the insulation and destruction of the entire insulation layer.

The present invention is directed to overcoming the problems as set forth above.

DISCLOSURE OF THE INVENTION

In one aspect of the present invention, a port liner assembly is adapted for use with an internal combustion engine. A tubular port liner includes a body having an outer surface which is composed entirely of a ceramic material containing a low temperature softening phase. An insulating layer of material including ceramic fibers substantially surrounds the outer surface. A means is disclosed for totally encapsulating the insulating layer of material. The encapsulating means is composed of a woven fiberglass cloth with high thermal resistance which is stitched in a quilted pattern to encapsulate the insulating layer to define a blanket removably fitted around the surface.

In another aspect of the present invention, a port liner assembly is provided for use with a cylinder head of an internal combustion engine. The cylinder head is composed of a cast metal which is molded around the port liner. A tubular port liner is disposed within the cylinder head and includes a body with an outer surface. The liner is composed entirely of a ceramic material containing a low temperature softening phase. An insulating layer of material including ceramic fibers substantially surrounds the outer surface. A means is disclosed for totally encapsulating the insulating layer of material. The encapsulating means is composed of a woven fiberglass cloth with a high thermal resistance which is stitched in a quilted pattern to encapsulate the insulating layer to define a blanket removably fitted around the surface.

In yet another aspect of the present invention, a method of making an insulated port liner assembly adapted for use with an internal combustion engine is provided. The method includes forming a tubular port liner from a material containing a low temperature softening phase. Then, substantially covering an outer surface of the liner with an layer of insulation composed of a material including ceramic fibers. Finally, encapsulating the layer of insulation by stitching a woven fiberglass cloth with high thermal resistance in a quilted pattern therearound to define a blanket with a plurality of pockets.

The present invention, through the use of encapsulating a layer of insulation within a thermal resistant insulating material provides a simple and durable method to limit heat rejection for greater engine efficiency.

BEST MODE FOR CARRYING OUT THE INVENTION

Figure 1:
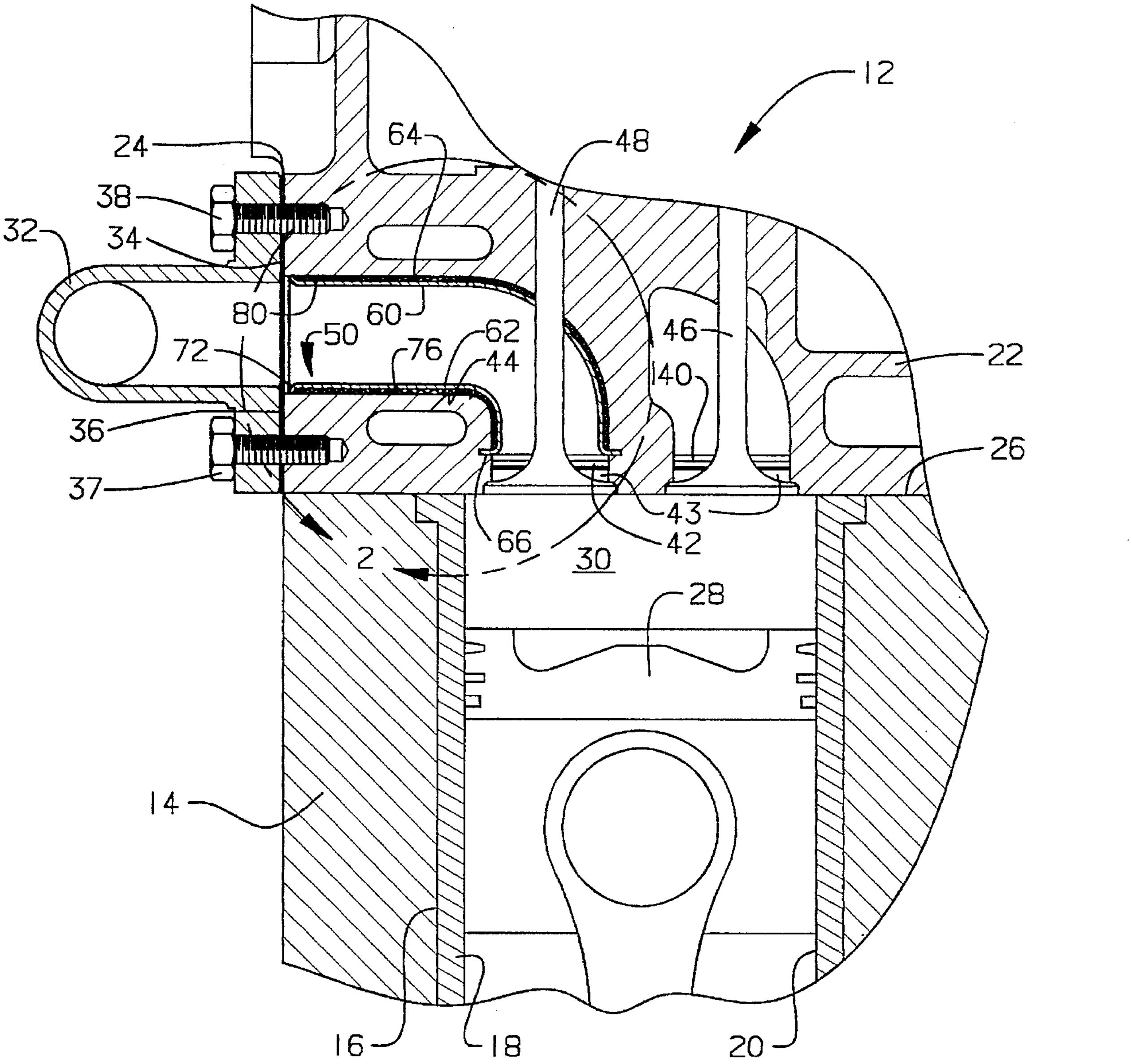
FIG. 1 is partial section view of an internal combustion engine embodying the present invention.

An internal combustion engine 12 having a cylinder block 14 defining a bore 16 is shown in FIG. 1. The bore 16 has a cylinder liner 18 disposed therein. The cylinder liner 18 defines a cylinder bore 20 and a cylinder head 22 has an outer mounting surface 24 and an inner mounting surface 26 which attaches to the cylinder block 14 in closing relation to the cylinder bore 20. The cylinder head 22 is composed of cast iron and can be formed by any suitable casting process. A piston 28 is reciprocally mounted in the cylinder bore 20 and defines with the cylinder head 22 a variable volume combustion chamber 30. An exhaust manifold 32 is releasably connected to the cylinder head 22 and has a mounting surface 34. An exhaust gasket 36 or any suitable type of sealing means is mounted between the outer mounting surface 24 of the cylinder head 22 and the mounting surface 34 of the exhaust manifold 32 by a plurality of bolts, two of which are shown at 37 and 38. An intake port 40 and exhaust port 42 are formed in the cylinder head 22. At least a portion of the exhaust port 42 has a substantially cylindrical wall 44 extending between the combustion chamber 30 and the exhaust manifold 32 to fluidly connect them. A valve seat 43 is disposed in both the intake and exhaust ports 40,42. An intake valve 46 and exhaust valve 48 having a normally closed position and an open position are disposed within the intake port and exhaust port 40,42, respectively. The intake port 40 fluidly communicates intake air to the combustion chamber 30 during an intake cycle of the engine 12. The exhaust port 42 fluidly communicates exhaust gases out of the combustion chamber 30 during an exhaust stroke of the engine 12. A turbocharger (not shown) is connected to the exhaust port 42 and to the intake port 40 between the combustion chamber 30 and the intake air.

Figure 2:
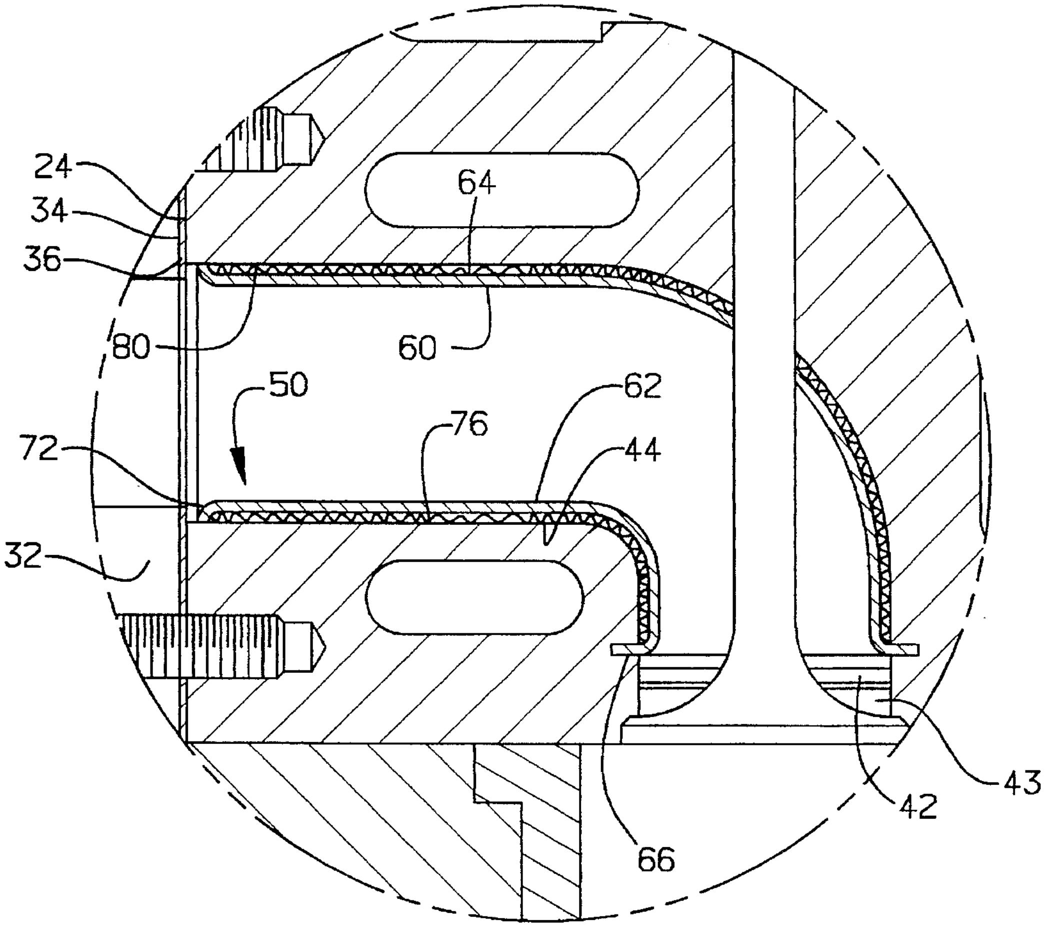
FIG. 2 is an enlarged view of the area encircled by line 2 as shown in FIG. 1.

A port liner assembly 50 is shown in FIGS. 1 and 2 and is cast in place within the cylinder head 22. For purposes of clarification, the port liner assembly 50 has been shown only on the exhaust port 42. However, it should be understood that the port liner 50 may be used on either the exhaust port 42 or the intake port 40. The port liner assembly 50 includes an exhaust port liner 60 which has a cylindrical body 62 disposed within the exhaust port 42 extending along the cylindrical wall 44. The cylindrical body 62 has an outer surface 64 and is composed of a structural ceramic formed with compounds having a low coefficient of thermal expansion and either moderate to high thermal conductivity. The structural ceramic has a microstructure consisting of ceramic particles held together by a low temperature softening phase, such as glass, glass-ceramic, or chemically bonded ceramic component. The coefficient of thermal expansion should be within the range of 3 to 5 E-6/C and should have a thermal conductivity within the range of 2–150 W/M° K. The cylindrical body 62 has an annular flange 66 which extends radially outwardly from the body 62 through the cylindrical wall 44 and into the cylinder head 22 a predetermined distance to support the exhaust port liner 60 within the exhaust port 42. The body 62 is spaced a predetermined distance away from the cylindrical wall 44 of the exhaust port 42. An outwardly extending annular lip 72 is connected to the body 62 in close proximity to the Cylindrical wall 44 so that a substantially enclosed space 76 is formed between the exhaust port liner 60 and the cylinder head 22.

It should be understood that although the wall 44 and the body 62 are disclosed as having cylindrical geometric shapes, that any suitable geometric shape may be used, such as rectangular, square, oval, etc.. It should also be understood that the location of the port liner 60 is not limited to the exhaust port 42 but may be used in any suitable location, such as the intake port 40. It should further be understood that the lip 72, the flange 66, and the body 62 may be manufactured as separate pieces. It should also be understood that the port liner 60 may be manufactured as a single cylindrical body without the flange 66 or the lip 72.

Figure 3:
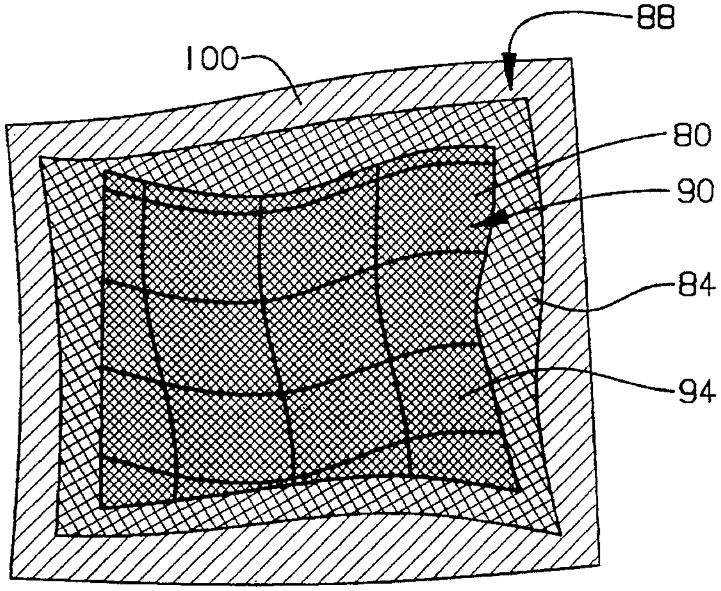
FIG. 3 is a diagrammatic view showing a portion of the present invention.

An insulating layer 80 of material is shown in FIGS. 1–3, but more specifically in FIG. 3 and is disposed within the enclosed space 76 and substantially surrounds the outer surface 64 to cover the cylindrical body 62 of the liner 60. The layer 80 includes insulating materials, such as low-shot alumino-silicate fibers or powder, mineral wool, or refractory ceramic fibers, but preferably alumino-silicate. A means 84 composed of an insulating material, such as bidirectional woven fiberglass, is used to encapsulate the insulating layer 80. The encapsulating means 84 must be composed of fiberglass cloth capable of withstanding casting temperatures exceeding 1400° C. However, it should be understood that the insulating material may consist of any suitable material capable of withstanding casting temperatures exceeding 1400° C. The insulating material 80 constitutes an inner layer of material while the woven fiberglass 84 constitutes an outer layer of material. The inner and the outer layers of material, made up of the insulating material 80 and fiberglass 84, respectively, serve to define an insulating blanket 88. The blanket 88 has a thickness in the range of about 0.25 inches to 0.325 inches. The blanket 88 is stitched in a quilted pattern 90 to define a plurality of individual, separated pockets 94. The pockets 94 have dimensions in the range of about 0.5 inches in length to about 1 inch in length and about 0.5 inches in width to 1 inch in width. However, it should be understood that any suitable stitching pattern or dimensions may be used.

A protective layer 100 may be formed around the blanket 88 to further protect the inner insulating layer 80. The protective layer 100 may be formed of any suitable material, but preferable a stainless steel foil.

Figure 4:
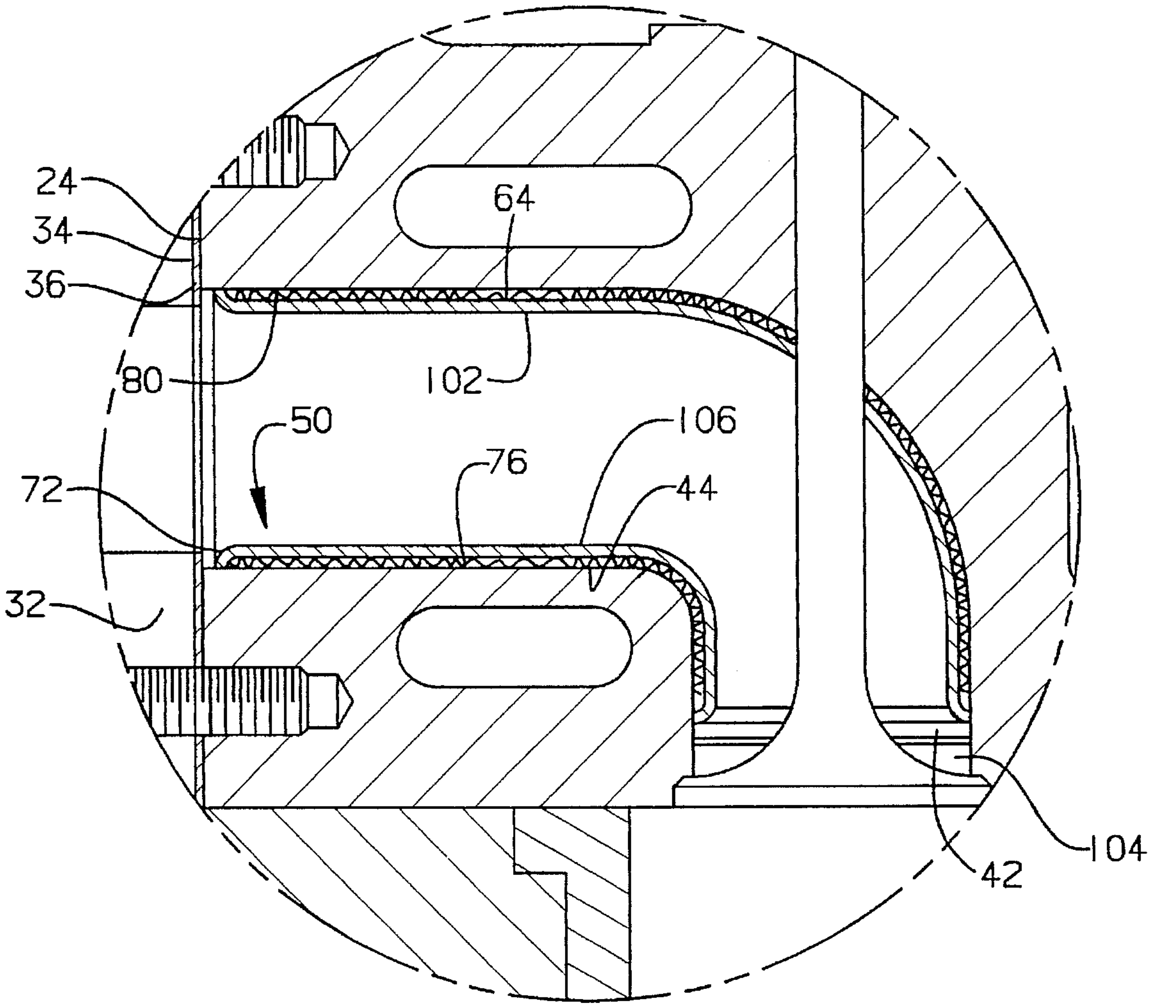
FIGS. 4–5 are enlarged views of alternative embodiments of the present invention.
Figure 5:
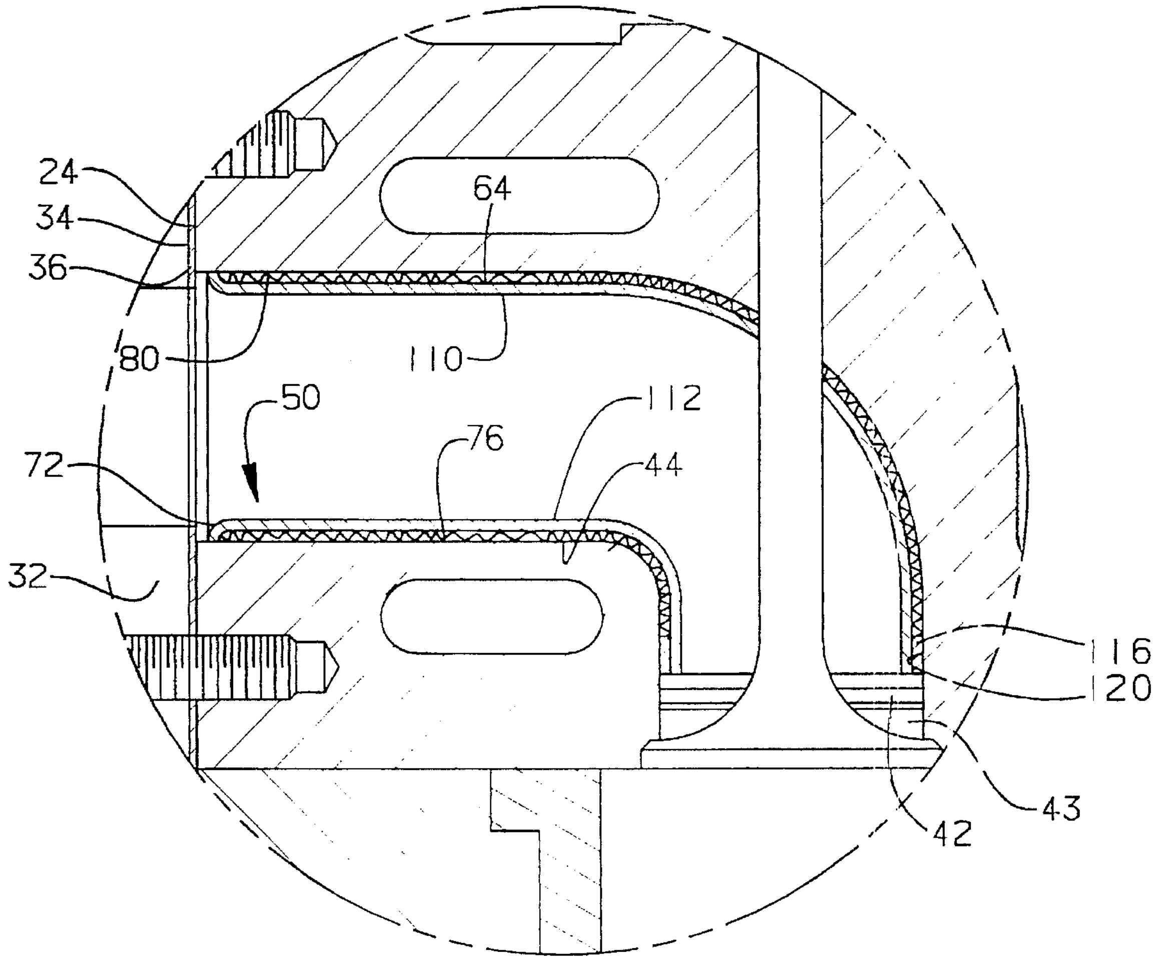

Other embodiments of the present invention are shown in FIGS. 4–5. It should be noted that the same reference numerals of the first embodiment are used to designate similarly constructed counterpart elements of these embodiments. It should be understood that the principles and techniques for the first embodiment described can be applied to the other embodiments shown and to variations thereof.

The port liner assembly 50 shown in FIG. 4 includes a port liner portion 102 and a valve seat portion 104 formed integrally and cast within the cylinder head 22. The port liner portion 102 has a cylindrical body 106 extending along the cylindrical wall 44. The valve seat portion 104 circumferentially surrounds the head of the valves 46,48. The port liner portion 102 and the valve seat portion 104 are made from the same structural ceramic described for FIG. 2 held together by a low temperature softening phase, such as glass, glass-ceramic, or chemically bonded ceramic component. The insulating blanket 88 extends a predetermined length of the cylindrical body 106 and terminates in close proximity to the valve seat portion 104.

The port liner assembly 50 shown in FIG. 5 includes a port liner 110 with a cylindrical body 112 extending along the cylindrical wall 44 toward the valve seat 43. The port liner 110 is made from the same structural ceramic described for FIG. 2 held together by a low temperature softening phase, such as glass, glass-ceramic, or chemically bonded ceramic component. A collar 116 is fitted around the outer diameter of the cylindrical body 112. The collar may be made from metallic or non-metallic materials, such as stainless steel or ceramics, capable of withstanding casting temperatures. The cylinder head 22 is formed with an annular groove 120 wherein the collar 116 is seated. The insulating blanket 88 extends along the cylindrical body 112 and terminates adjacent the collar 116.

Industrial Applicability

In use, high temperature exhaust gas generated during combustion is released during the exhaust stroke of the internal combustion engine 12. The exhaust gas is communicated from the combustion chamber 30 and into the exhaust port 42 when the exhaust valve 48 is in the open position. It is important that heat produced from the high temperature exhaust gas be retained within the exhaust port 42 before entering the exhaust manifold 32 so that more thermal energy can be supplied to the turbocharger (not shown) for greater engine efficiency. Furthermore, a reduction in heat that is dissipated to the cooling water, decreases the cooling system requirements. Additionally, it is important that the incoming intake air from the turbocharger remains at an elevated temperature before entering the combustion chamber 30 for increased efficiency of the engine 12.

Referring to FIG. 2, the blanket 88 is formed when the inner layer of insulating ceramic material 80 is encapsulated within an outer layer of fiberglass 84. The fiberglass 84 is made from a cloth capable of withstanding the high temperatures of the casting process and subsequent exhaust gas temperatures. The blanket 88 is stitched in a quilted pattern 90 to separate the insulating materials into the plurality of individual pockets 94. The blanket 88 is then wrapped around the outer surface 64 of the ceramic body 62 of the port liner 60 to form the port liner assembly 50.

The port liner assembly 50 is then cast in place within the cylinder head 22 within the intake or exhaust port 40,42. It should be understood that the flange 66 may be used to support the port liner 60 during the casting process. During the casting process, stresses occur due to the large difference in thermal expansion coefficients between the cast iron and the port liner assembly 50. The difference in the thermal expansion coefficients ordinarily would cause damage to the ceramic material of the port liner 60. However, in the present invention, damage to the ceramic port liner 60 is virtually eliminated. This is accomplished because the ceramic port liner 60 is composed of a material which softens above 800° C. However, it should be understood that the ceramic port liner 60 could contain a low temperature softening phase which softens at a temperature lower than 800° C. as long as sufficient softening occurs to produce similar results. Since cast iron is heated to above 800° C. during the casting process and solidifies around 1100° C., the ceramic port liner 60 is maintained in a softened state during the entire casting process. As the casting cools, the ceramic port liner 60 returns to a regular solid state at a progressively decreasing thermal rate sufficient to protect it from damage. The blanket 88 further protects the ceramic port liner 60 from casting stresses and thermal shock by preventing molten iron from contacting the ceramic material. Additionally, the ceramic port liner 60 is better able to withstand the thermal cycles experienced during normal engine operation. This is achieved due to the ceramic port liner 60 at exhaust temperatures having a similar total expansion rate as the cast iron running at cooler, coolant water temperatures. The ability of the ceramic port liner 60 to maintain a similar expansion rate as the cast iron increases its durability.

The quilted stitching pattern 90, due to separating the insulating layer of material 80 into the plurality of individual pockets 94, supports and protects the pockets 94 individually. If damage should occur to one of the plurality of pockets 94, the inner insulating layer 80 would remain intact within the remaining plurality of pockets 94. Therefore, the surrounding pockets 94 retain their individual inner insulating layer 80, increasing the durability of the blanket 88 and prolonging the life of the insulating layer 80. The ability to protect the insulating layer 80 from catastrophic damage increases efficiency and decreases the rate of heat loss. The decreased rate of heat loss retains thermal energy in the exhaust gas for driving the turbocharger (not shown) at a faster rate which increases incoming air pressure for increased engine efficiency.

Referring to FIGS. 4–5, the method of supporting the port liner assembly 50 within the cylinder head 22 is substantially different than FIG. 2. However, it should be understood that the operation and capabilities of the embodiments shown in FIGS. 4–5 are similar to that described in FIG. 2.

Referring to FIG. 4, the port liner assembly 50, including the integral port liner and valve seat portions 102,104 and the blanket 88, are cast in place within the cylinder head 22 within the intake or exhaust port 40,42. It should be understood that the position of the valve seat portion 104 supports the port liner portion 102 during the casting process.

Referring to FIG. 5, the port liner assembly 50, including the port liner 110 and the blanket 88, are cast in place within the cylinder head 22 within the intake or exhaust port 40,42. The collar 116 is press fitted around the cylindrical body 112 to ensure the port liner 110 is supported during the casting process.

In view of the above, it is apparent that the present invention provides a means for encapsulating a layer of insulation within a thermally resistant insulating material to provide a simple and durable method to limit heat rejection for greater engine efficiency.

We claim:

1. A port liner assembly adapted for use with an internal combustion engine, comprising:

a tubular port liner including a body having an outer surface, the liner being composed entirely of a ceramic material containing a low temperature softening phase;

an insulating layer of material including ceramic fibers substantially surrounding the outer surface; and means for totally encapsulating the insulating layer of material, the encapsulating means being composed of a woven fiberglass cloth with high thermal resistance which is stitched in a quilted pattern to encapsulate the insulating layer within a plurality of individual pockets to define a blanket removably fitted around the surface.

2. The port liner assembly of claim 1, wherein the low temperature softening phase is glass or glass-ceramic.

3. The port liner assembly of claim 1, wherein the low temperature softening phase is a chemically bonded component.

4. The port liner assembly of claim 1, wherein the liner is composed of a ceramic material containing a low temperature softening phase which softens at a temperature above 800° C.

5. A port liner assembly for use with a cylinder head of an internal combustion engine, the cylinder head being composed of a cast metal which is molded around the port liner assembly, comprising:

a tubular port liner being disposed within the cylinder head and including a body having an outer surface, the liner being composed entirely of a ceramic material containing a low temperature softening phase;

an insulating layer of material including ceramic fibers substantially surrounding the outer surface; and means for totally encapsulating the insulating layer of material, the encapsulating means being composed of a woven fiberglass cloth with high thermal resistance which is stitched in a quilted pattern to encapsulate the insulating layer within a plurality of individual pockets to define a blanket removably fitted around the surface.

6. The port liner assembly of claim 5, wherein the low temperature softening phase is glass or glass-ceramic.

7. The port liner assembly of claim 5, wherein the low temperature softening phase is a chemically bonded component.

8. The port liner assembly of claim 5, wherein the liner is composed of a ceramic material containing a low temperature softening phase which softens at a temperature above 800° C.

9. A method of making an insulated port liner assembly adapted for use with an internal combustion engine, comprising the steps of:

forming a tubular port liner from a material having a low temperature softening phase;

covering substantially an outer surface of the liner with an insulation composed of a material including ceramic fibers; and encapsulating the layer of insulation by stitching a woven fiberglass cloth with high thermal resistance in a quilted pattern therearound to define a blanket with a plurality of individual pockets wherein a portion of the insulation is distributed within each of the plurality of individual pockets.

10. The method of making an insulated port liner assembly of claim 9, including the step of:

utilizing glass or glass-ceramic for the low temperature softening phase.

11. The method of making an insulated port liner assembly of claim 9, including the step of:

utilizing a chemically bonded ceramic component for the low temperature softening phase.

12. The method of making an insulated port liner assembly of claim 9, including the step of:

utilizing a ceramic material having a low temperature softening phase which softens at a temperature above 800° C.

13. A method of retaining an insulated port liner assembly within a cylinder head of an internal combustion engine, comprising the steps of:

forming a tubular port liner from a material having a low temperature softening phase;

covering substantially an outer surface of the liner with an insulation composed of a material including ceramic fibers;

encapsulating the layer of insulation by stitching a woven fiberglass cloth with high thermal resistance in a quilted pattern therearound to define a blanket with a plurality of individual pockets wherein a portion of the insulation is distributed within each of the plurality of individual pockets; and casting the port liner assembly within the cylinder head.

14. The method of retaining an insulated port liner assembly of claim 13, including the step of:

forming a flange radially outwardly at an end of the tubular port liner so that during casting of the port liner assembly within the cylinder head the flange is fixed therein.

15. The method of retaining an insulated port liner assembly of claim 13, including the step of:

fitting a collar circumferentially around an end of the tubular port liner so that during casting of the port liner assembly within the cylinder head the collar is fixed therein.

16. The method of retaining an insulated port liner assembly of claim 13, including the step of:

forming a valve seat portion integrally with the tubular port liner to further define the port liner assembly so that during casting of the port liner assembly within the cylinder head the valve seat is fixed therein.

* * * * *